No. 647,429.  
R. TEMPLE.  
EXPANSIBLE PULLEY.  
(Application filed Dec. 19, 1899.)

Patented Apr. 10, 1900.

(No Model.)  
2 Sheets—Sheet 1.

Witnesses  
J. S. Elliott.  
E. A. Finckel.

Inventor  
Robert Temple  
by W. H. Finckel  
his Attorney

No. 647,429. Patented Apr. 10, 1900.
R. TEMPLE.
EXPANSIBLE PULLEY.
(Application filed Dec. 19, 1899.)
(No Model.) 2 Sheets—Sheet 2.
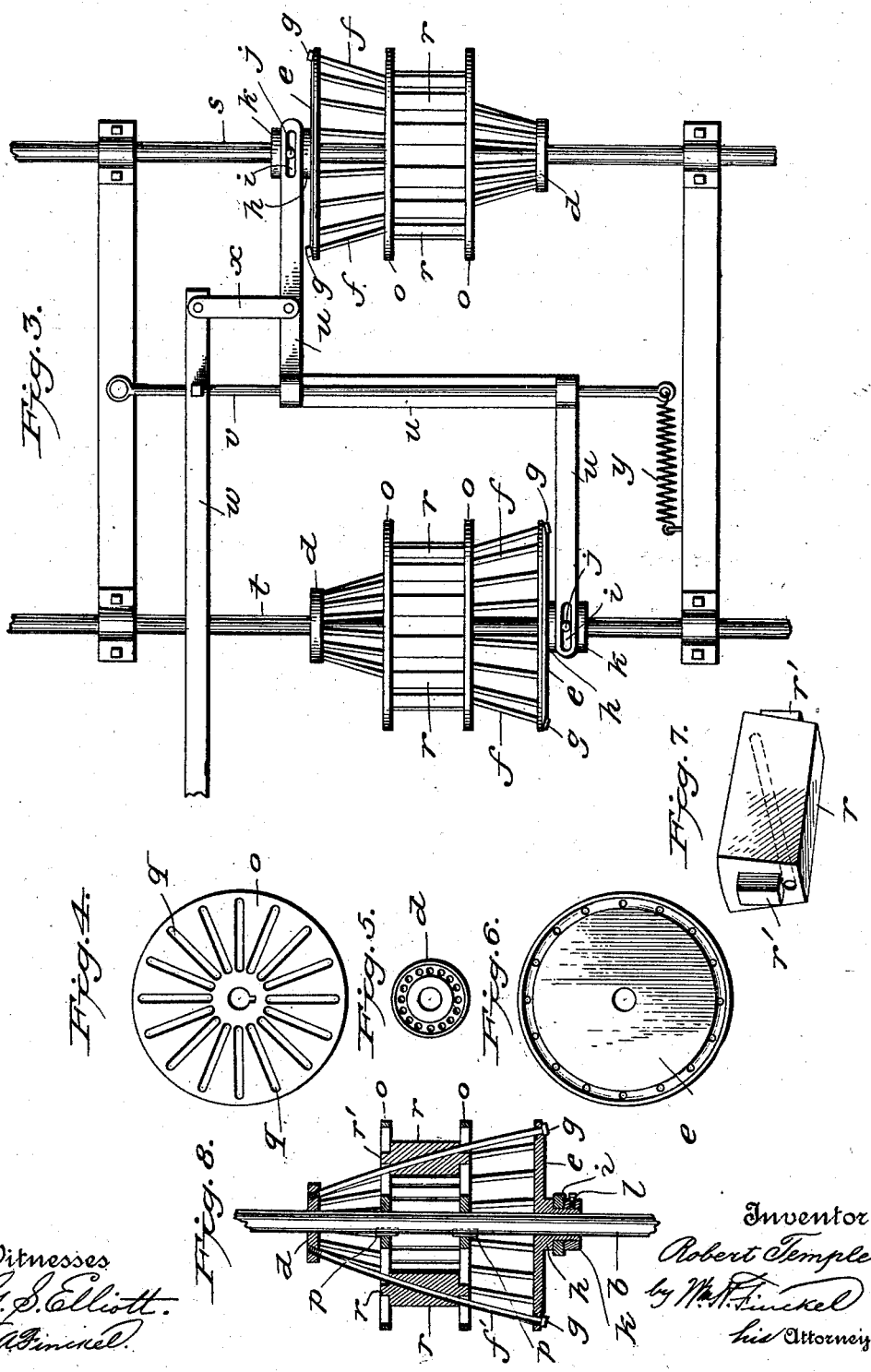
Witnesses
G. S. Elliott.
E. A. Finckel.
Inventor
Robert Temple
by W. F. Finckel
his Attorney

UNITED STATES PATENT OFFICE.

ROBERT TEMPLE, OF DENVER, COLORADO, ASSIGNOR TO THE TEMPLE GAS ENGINE AND MACHINE COMPANY, OF SAME PLACE.

EXPANSIBLE PULLEY.

SPECIFICATION forming part of Letters Patent No. 647,429, dated April 10, 1900.

Application filed December 19, 1899. Serial No. 740,906. (No model.)

*To all whom it may concern:*

Be it known that I, ROBERT TEMPLE, a citizen of the United States, residing at Denver, in the county of Arapahoe and State of Colorado, have invented a certain new and useful Improvement in Expansible Pulleys, of which the following is a full, clear, and exact description.

This invention relates to that class of apparatus by which a change of speed of a shaft or other object may be instantly obtained by means of a driving-pulley the diameter of which may be changed. Such pulleys are commonly known as "expansible" pulleys.

In carrying out my invention I provide a "cone of rods," as I shall hereinafter designate it, which is movable longitudinally within a band-pulley, the latter being fixed relatively to the driven shaft and having a peripheral surface which may be expanded and contracted by the longitudinal movement of the cone of rods, so as to increase and decrease, respectively, the diameter of the pulley, and thus correspondingly affect the speed of the belt or band. Such an apparatus may be used to transmit motion to an ordinary band-pulley, or it may be used with a second expansible pulley, and in the latter case the two pulleys will be connected for simultaneous operation in such manner that as one pulley is expanded the other pulley will be contracted; and another feature of the invention is the provision of means for taking up slack in the belt or band.

Having thus stated the principle of my invention, I will proceed to describe the best mode in which I have contemplated applying that principle and then will particularly point out and distinctly claim the part, improvement, or combination which I claim as my invention.

Figure 1:
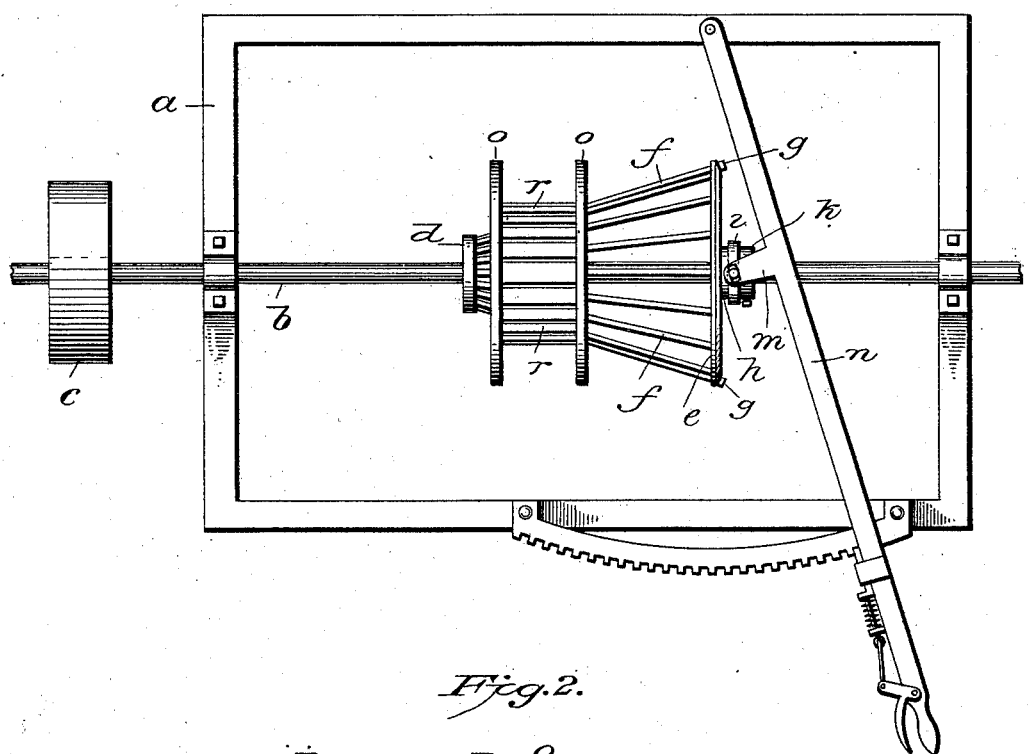
Figure 2:
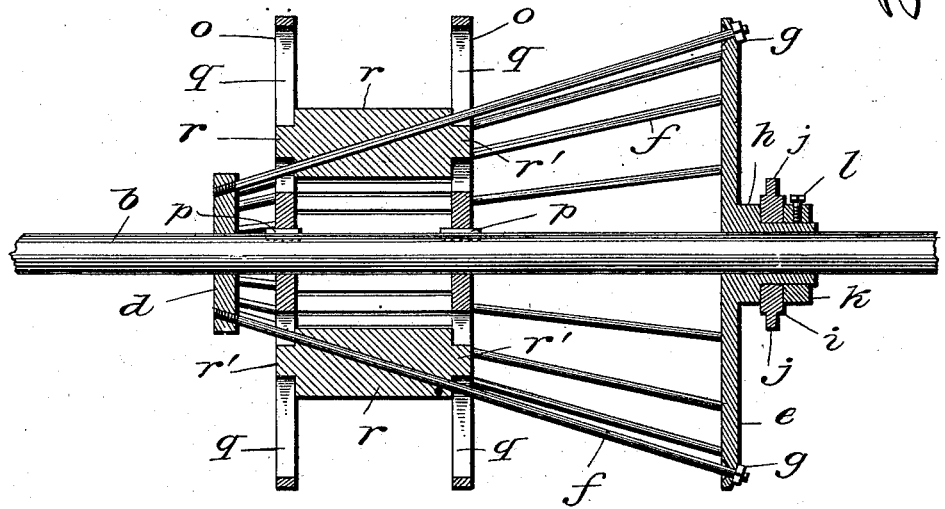

In the accompanying drawings, illustrating my invention, in the several figures of which like parts are similarly designated, Figure 1 is a plan view illustrating one form of my invention with the pulley at or near its most contracted or smallest state. Fig. 2 is a longitudinal section, on a larger scale, of the expansible pulley in the position and condition shown in Fig. 1. Fig. 3 is a plan view illustrating one form of a pair of expansible pulleys. Fig. 4 is an elevation of one of the pair of complemental disks which form the sides of the band-pulley. Figs. 5 and 6 are elevations of the two disks forming the opposite ends or sides of the "cone of rods," so called. Fig. 7 is a perspective view of one of the sectors or blocks forming the belt-receiving surface of the band-pulley. Fig. 8 is a longitudinal section of an expansible pulley to be used in pairs with one form of means for taking up the slack in the belt or band.

I have shown merely conventional accessories for mounting my expansible pulley, and, referring to Fig. 1, $a$ may represent a frame, in which is suitably mounted a shaft $b$, which may be driven by a pulley $c$ or any other mechanism. This shaft has mounted upon it loosely a disk $d$ of one diameter and another disk $e$ of larger diameter, and these disks are united by a series of rods $f$, some or all of which may be screw-threaded into the disk $d$ and secured to the disk $e$ by nuts $g$, as shown more particularly in Fig. 2, in such manner that the said disks and rods form a cone of rods, as hereinbefore and hereinafter referred to, the real formation being that of a skeleton truncated cone.

The disk $e$ has a hub $h$, upon which is mounted a ring $i$, having trunnion-like opposite projections $j$, and this ring is held in place by means of a collar $k$, secured to the hub $h$ by a set-screw $l$, and arranged to permit the cone of rods to revolve without carrying around with it the said ring $i$. The projections $j$ of the ring $i$ are engaged by a fork $m$ on a lever $n$, and this lever is provided with any suitable latch and toothed rack to hold the cone of rods in any adjusted position longitudinally of the shaft given to it by means of the movement of the lever $n$. Of course I do not limit my invention to the means described for shifting the cone of rods longitudinally and simply show the device described as one means for accomplishing that purpose.

The pulley itself or that portion of the device which receives the band or belt is composed of similar or complemental disks $o$, which are made fast to the shaft $b$, so as to rotate therewith, by any suitable means, such as the keys $p$. These disks are slotted radially, as shown more especially in Figs. 2 and 4 at q, and in these radial slots are arranged the peripheral blocks r, through which the rods f of the cone of rods pass obliquely, the said rods also passing through the radial slots in the disks o. The blocks r are provided with end lugs r', which are adapted to enter the slots q in the disks o to hold the said blocks between the said disks and guide them in their inward and outward movements, the ends of the blocks adjacent to said disks working against the adjacent faces of the said disks. The blocks r constitute the surface upon which the belt or band is supported.

The various blocks which constitute the belt-receiving surface of the pulley are made as sectors of a cylinder, and their belt-receiving surfaces may be flat or crowning or curved or otherwise prepared or formed to receive the character of belt or band which is to be used; but in any case the belt-receiving surfaces formed by these blocks is essentially a cylinder, and by using a great number of small blocks and a corresponding number of rods the continuity of the belt-receiving surface from the smallest to the largest diameter may be more perfectly preserved than if a few blocks were used, and thus a very perfect and complete contact with the belt is possible in all the variations of the diameter of the pulley.

It will be observed that each of the blocks constituting the belt-receiving surface of the pulley is supported at both ends by the lugs, which slide in the radial slots of the disks o, and by contact with said disks, and the result of this construction is that the pull of the belt is transmitted directly to the disks with very little strain on the cone of rods, and thus the rods constituting the cone of rods are largely relieved of strain. It will be observed also, inasmuch as the band-pulley itself, consisting of the disks o and blocks r, is fixed to the shaft b and turns with it and the cone of rods is capable of a longitudinal motion through said band-pulley, that the movement of said cone of rods to the right or to the left will contract or expand the diameter of the band-pulley by moving these blocks toward the center or toward the circumference, respectively, and thus the transmitted speed will be varied as may be desired, and this change of speed may be effected without stopping the machinery.

When these pulleys are used in pairs and operate simultaneously, a belt passing over the pulleys, if taut when the pulleys are of extreme dimensions, (one large and one small,) would be slackened somewhat when the pulleys are of intermediate diameters, thus tending to make the belt slip. I obviate this tendency to slacken the belt by giving the rods f' a slightly-outward curve, as shown in Fig. 8, which makes the pulleys in their intermediate positions a little larger in diameter than would be the case if the rods were straight, thus regulating the change in the diameters of the pulleys, so as to require a constant length of belt and make the belt equally taut in all positions of the pulleys. This would not be so if the rods were straight. In Fig. 8 the arc of curvature is exaggerated in order to direct attention to the fact of curvature; but in practice this curvature is but very slight.

In Fig. 3 I have shown one arrangement in which two expansible pulleys are to be banded together, so as to transmit motion from a driving to a driven shaft. The letter s may designate the driving-shaft, having an expansible pulley of the character just described, and t may be the driven shaft, also having a similar expansible pulley, but arranged reversely to the pulley on the shaft s. The mechanism for operating simultaneously the two cones of rods may comprise a rigid angular connecting-rod u, connected with the hubs of the cones of rods and supported upon a vibrating guide v, suitably suspended from any fixed device or frame, the said guide having pivoted to it an operating-lever w, which is connected by a link x with one member of the angular connecting-rod u. The guide v has at its free end a spring y, which normally pulls the said guide toward the left, Fig. 3, and thus tends to force and hold the two cones of rods toward the pulleys, so as to exert a tightening action upon the belt, and thereby keep the belt taut. Of course this automatic action of the spring y on the cone-connecting rod is entirely independent of the action of the shifting lever w.

The curving of the rods shown in Fig. 8 obviates the necessity of the spring y and also the necessity of pivoting the rod v, which latter can be fastened rigidly at each end in such case.

The rods of the cone of rods may be of circular, square, oblong, or other shape in cross-section, as may be desired.

By my construction I provide a very simple, easily-operated, effective, very light, strong, and inexpensive power-transmitting apparatus composed of few parts and not liable to get out of order and easily repaired, and also one which is capable of use with ordinary belts.

It is within my invention to vary the details of construction of parts and as a whole.

What I claim is—

1. The combination of a shaft, two parallel complemental disks fixed to said shaft and provided with radial slots, a series of blocks of the form of sectors of a cylinder and provided at each end with lugs arranged in said slots, another pair of disks freely mounted upon said shaft and of different diameter, and a series of inclined rods connecting the last-mentioned pair of disks and forming a cone of rods which as a whole is adapted to be slid longitudinally of the shaft, each of said rods passing obliquely through a block and the adjacent slots in the first-mentioned disks, whereby, when the cone of rods is moved longitudinally of the shaft the said blocks will be moved radially outward or inward to increase or diminish the diameter of the pulley formed by the first-mentioned pair of disks and their connected blocks, substantially as described.

2. An expansible pulley, comprising essentially a cone of rods, a shaft upon which it is loosely mounted, means to move said cone of rods longitudinally of the shaft, a pair of disks fixed to said shaft and slotted radially, the rods of the cone of rods passing through said slots, and a series of blocks through which said rods pass obliquely and having end lugs engaging said radial slots in said fixed disks, whereby as the said cone of rods is moved longitudinally of the shaft the expansion and contraction of the pulley is effected, substantially as described.

3. The combination of a shaft, two parallel complemental disks fixed to said shaft and provided with radial slots, a series of blocks, each block being of the form of a sector of a cylinder and provided at its opposite ends with lugs arranged in opposite parallel radial slots and thereby adapting the blocks to slide in said radial slots, and a cone of rods arranged upon said shaft and adapted to be slid longitudinally thereon, each of the several rods of the cone of rods passing through adjacent slots in the complemental disks and through the block therein, whereby when the said cone of rods is moved longitudinally of the shaft, the said blocks will be moved radially outward or inward respectively to increase or diminish the diameter of the pulley formed by the said disks and their blocks, substantially as described.

4. An expansible pulley, comprising a shaft, a pair of disks fixed to said shaft and slotted radially, sliding blocks arranged in said slots and between the said disks, and a cone of rods mounted loosely upon the said shaft and capable of longitudinal motion thereon, the rods of the said cone of rods having an outward curvature and passing obliquely through the blocks, substantially as described.

In testimony whereof I have hereunto set my hand this 16th day of December, A. D. 1899.

ROBERT TEMPLE.

Witnesses:
FREDERICK O. VAILLE,
JOSEPH S. DAVIS.